United States Patent [19]

Hosack et al.

[11] Patent Number: 5,418,528

[45] Date of Patent: May 23, 1995

[54] METHOD AND APPARATUS FOR PRIORITIZING DELETION OF RECEIVED MESSAGES BASED ON MESSAGE SOURCE AND MESSAGE ORDER

[75] Inventors: Nichola B. Hosack, Coral Springs; Gregory L. Cannon, Boynton Beach; Edward H. Robinson, Delray Beach; Richard A. Hill, Hollywood; Nancy E. Mondrosch, Boynton Beach; William J. Macko, West Palm Beach, all of Fla.

[73] Assignee: Motorola, Inc., Schaumburg, Ill.

[21] Appl. No.: 113,132

[22] Filed: Aug. 30, 1993

[51] Int. Cl.⁶ ................................. G08B 5/22
[52] U.S. Cl. .................... 340/825.44; 340/825.22
[58] Field of Search ............ 340/825.44, 825.22, 340/825.51; 455/38.1, 38.4

[56] References Cited

U.S. PATENT DOCUMENTS

| | | | |
|---|---|---|---|
| 4,851,829 | 7/1989 | DeLuca et al. | 340/825.44 |
| 4,949,085 | 8/1990 | Fisch et al. | 340/825.44 |
| 4,988,991 | 1/1991 | Motegi | 340/825.5 |
| 5,075,684 | 12/1991 | DeLuca | 340/825.47 |

*Primary Examiner*—Michael Horabik
*Attorney, Agent, or Firm*—Kelly A. Gardner; John H. Moore

[57] ABSTRACT

A radio receiver (110) for receiving messages from a plurality of sources includes a message database (252) for storing the messages and sources from which the messages originate and a processing unit (220) for determining whether each source has a status of anchored or unanchored. The processing unit (220) further flags last received messages from anchored sources to indicate that the last received messages are anchored messages which are to be deleted only after deletion of unanchored messages which are not flagged as anchored messages.

25 Claims, 7 Drawing Sheets

| MESSAGE DATABASE | | | |
|---|---|---|---|
| | MESSAGE | SOURCE | TIME |
| u | CALL EXT. 7122 | BUSINESS | 2:30pm |
| r | WHEN ARE YOU COMING HOME? | PERSONAL | 2:12pm |
| a r | FILTERS, INC STOCK AT 70 | STOCK SERVICE | 2:00pm |
| r | MEETING CHANGED TO 4 | BUSINESS | 1:58pm |
| r | LUNCH AT 1? | PERSONAL | 11:42am |
| u | FILTERS, INC STOCK AT 72 | STOCK SERVICE | 11:40pm |
| r | MEETING AT 3pm | BUSINESS | 10:02am |
| r | FILTERS, INC STOCK AT 68 | STOCK SERVICE | 9:36am |
| u | WHERE IS THE CHART? | BUSINESS | 8:15am |

*FIG. 5*

| DELETION ORDER (FROM TOP TO BOTTOM) FOR MESSAGES STORED IN MESSAGE DATABASE | | | |
|---|---|---|---|
| r | FILTERS, INC STOCK AT 68 | STOCK SERVICE | 9:36 am |
| r | MEETING AT 3 pm | BUSINESS | 10:02 am |
| r | LUNCH AT 1? | PERSONAL | 11:42 am |
| r | MEETING CHANGED TO 4 | BUSINESS | 1:58 pm |
| r | WHEN ARE YOU COMING HOME? | PERSONAL | 2:12 pm |
| u | WHERE IS THE CHART? | BUSINESS | 8:15 am |
| u | FILTERS, INC STOCK AT 72 | STOCK SERVICE | 11:40 am |
| u | CALL EXT. 7122 | BUSINESS | 2:30 pm |
| a r | FILTERS, INC STOCK AT 70 | STOCK SERVICE | 2:00 pm |

*FIG. 6*

| ORDER OF MESSAGE PRESENTATION | | |
|---|---|---|
| CALL EXT. 7122 | BUSINESS | 2:30 pm |
| WHEN ARE YOU COMING HOME? | PERSONAL | 2:12 pm |
| FILTERS, INC STOCK AT 70 | STOCK SERVICE | 2:00 pm |
| MEETING CHANGED TO 4 | BUSINESS | 1:58 pm |
| LUNCH AT 1? | PERSONAL | 11:42 am |
| MEETING AT 3pm | BUSINESS | 10:02 am |
| WHERE IS THE CHART? | BUSINESS | 8:15 am |

METHOD AND APPARATUS FOR PRIORITIZING DELETION OF RECEIVED MESSAGES BASED ON MESSAGE SOURCE AND MESSAGE ORDER

FIELD OF THE INVENTION

This invention relates in general to radio devices for receiving and storing messages, and more specifically to methods for prioritizing deletion of the received messages.

BACKGROUND OF THE INVENTION

Selective call receivers, such as pagers, typically receive a radio frequency signal, which is decoded to recover an address and a message included therein. Generally, when the received address corresponds to a stored receiver address, the received message is stored in the memory of the selective call receiver. Additionally, upon receipt and storage of a message, the selective call receiver provides a sensible alert, such as an audible tone, to announce reception of the message to a user. Thereafter, either automatically or in response to user initiated commands, the message is retrieved from memory and presented to the user. The presentation of the message can be, for example, a visual presentation by a display or an audible presentation by a transducer.

As further messages are received, each is processed in the above-described manner. As a result, situations can arise in which the memory of the selective call receiver becomes full, i.e., no available memory space remains. In this case, some conventional selective call receivers delete older messages as necessary to free memory space for storage of newly received messages. This deletion method, however, can easily result in the deletion of a message before it has been read or the deletion of a message which is of importance to the user.

Thus, what is needed is a method and apparatus for prioritizing the deletion of stored messages.

SUMMARY OF THE INVENTION

A method, in a radio receiver for receiving messages from a plurality of sources, for prioritizing a deletion order for received messages, comprises the step of designating each of the plurality of sources as anchored sources or unanchored sources. The method further comprises the step of flagging at least last received messages from the anchored sources as anchored messages, wherein the anchored messages are deleted only after deletion of stored messages which are not flagged as anchored messages, and wherein each of the at least last received messages is automatically flagged without user input in response to reception of each of the at least last received messages.

A radio receiver for receiving messages from a plurality of sources comprises first designating means for designating each of the plurality of sources as anchored sources or unanchored sources and flagging means coupled to the first designating means for flagging at least last received messages from the anchored sources as anchored messages. The anchored messages are deleted only after deletion of stored message which are not flagged as anchored messages, and each of the at least last received messages is automatically flagged without user input in response to reception of each of the at least last received messages.

BRIEF DESCRIPTION OF THE DRAWINGS

FIG. 5 is a table showing examples of messages which could be stored by the radio receiver of FIG. 2 in accordance with a preferred embodiment of the present invention.

FIG. 6 is a table showing the deletion order of the messages of FIG. 5 in accordance with a preferred embodiment of the present invention.

DESCRIPTION OF A PREFERRED EMBODIMENT

Figure 1:
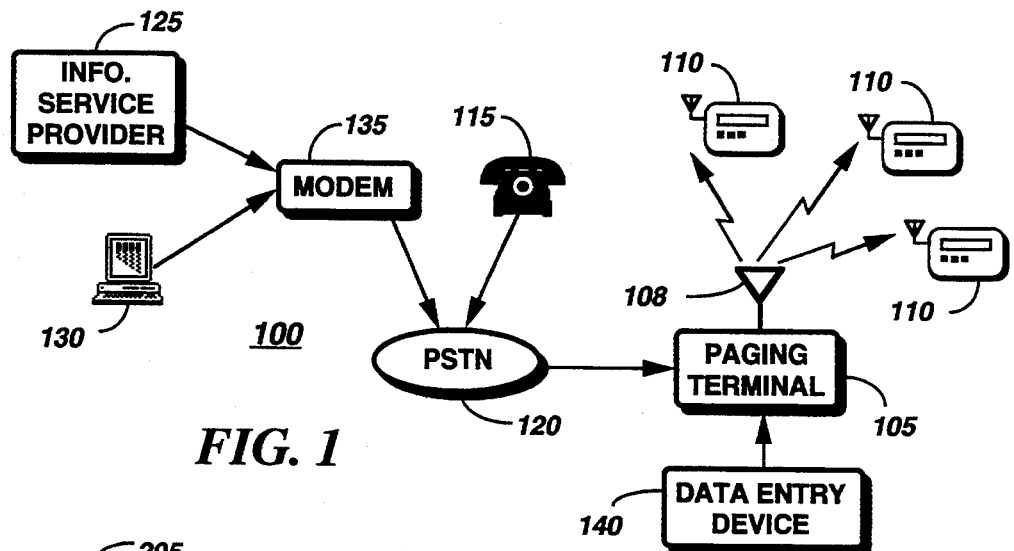
FIG. 1 is an illustration of a paging system in accordance with a preferred embodiment of the present invention.

FIG. 1 is an illustration of a paging system 100 providing for radio frequency (RF) communication. The paging system 100 preferably comprises a paging terminal 105 for encoding information using a signaling protocol such as the POCSAG (Post Office Code Standardization Advisory Group) protocol or the GSC (Golay Sequential Code) protocol. The encoded information is then modulated and transmitted by an antenna 108 as an RF signal, which is received by radio receivers 110 included in the paging system 100.

Information can enter the paging system 100 from a variety of sources, for example, from a conventional telephone 115 coupled to the paging terminal 105 via a telephone system, such as the public switched telephone network (PSTN) 120. Additionally, the paging terminal 105 can receive information from other sources, such as an information service provider 125, which provides news information, stock information, etc. in the form of databases, or a personal computer 130 coupled to the PSTN 120 by a modem 135. A data entry device 140 coupled directly to the paging terminal 105 can be employed to provide paging information to the paging terminal 105 or to modify operating information stored by the paging terminal 105. The operating information can be, for example, a listing of subscribers to the paging system 100 or a billing status of each subscriber.

Figure 2:
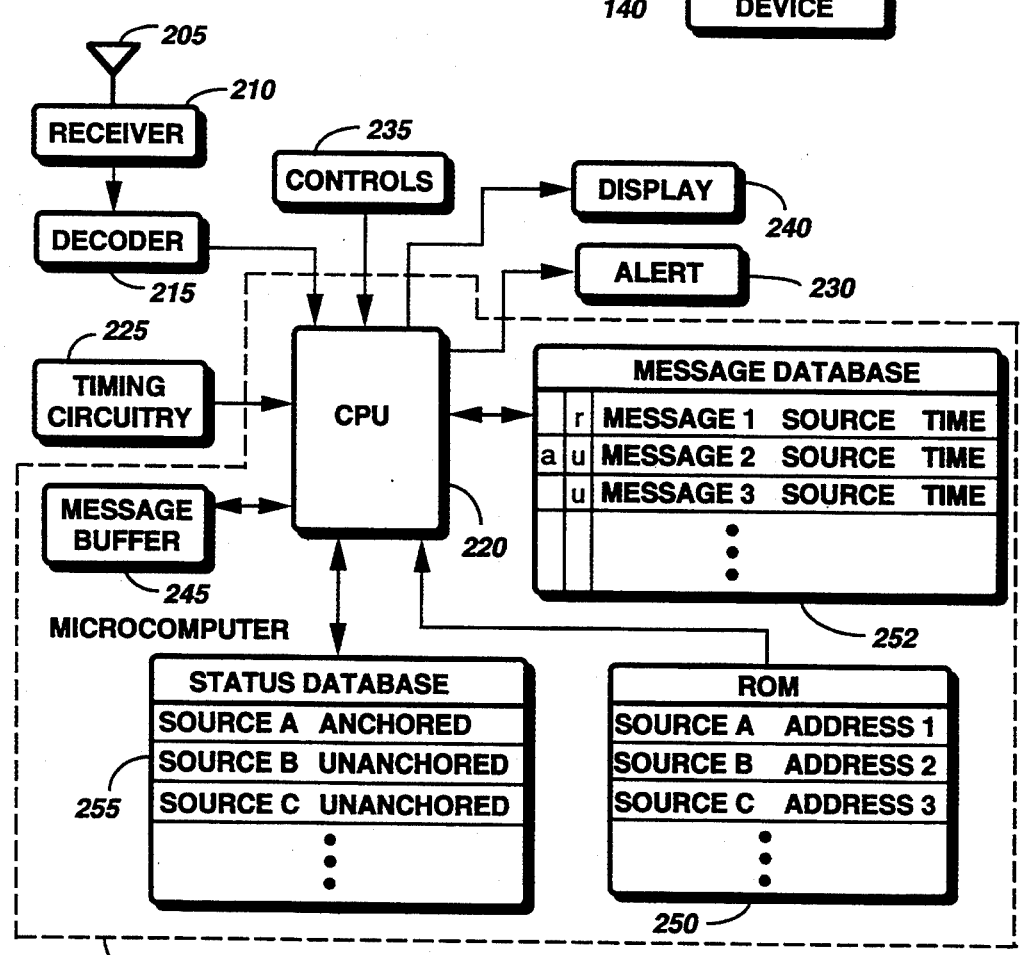
FIG. 2 is an electrical block diagram of a radio receiver included in the paging system of FIG. 1 in accordance with a preferred embodiment of the present invention.

Referring next to FIG. 2, an electrical block diagram of a radio receiver 110 included in the paging system 100 is depicted. The radio receiver 110 preferably comprises an antenna 205 for receiving an RF signal transmitted by the paging terminal 105 and for providing the signal to a receiver 210 which demodulates the signal to generate data therefrom. A decoder 215 coupled to the receiver 210 decodes the RF signal to recover the paging information, which typically comprises a message and an address associated with the radio receiver 110. The information is further processed by a central processing unit (CPU) 220 coupled to the decoder 215 for controlling the operation of the radio receiver 110.

The radio receiver 110 further comprises timing circuitry 225 for generating time values used by the CPU 220 during the operation of the radio receiver 110. The timing circuitry 225 can include, for example, a crystal (not shown) for generating timing signals and an oscillator (not shown) for generating the time values therefrom. Further coupled to the CPU 220 is an alert 230, such as a transducer or a vibrating motor, for generating a sensible alert announcing reception of a message. Controls 235 coupled to the CPU 220 and accessible from the exterior of the radio receiver 110 relay user inputs to the CPU 220, in response to which the CPU 220 can transmit received messages to a display 240 for presentation to the user.

According to the present invention, a message buffer 245 is coupled to the CPU 220 for temporarily storing a received message and address and the time associated with reception of the message. The time is preferably determined from the time values provided by the timing circuitry 225 in a manner well known to one of ordinary skill in the art. A memory, such as a read only memory (ROM) 250 or a programmable code plug, is utilized for storage of addresses on which the radio receiver 110 can receive messages and for storage of sources associated with each of the addresses. The sources can be, for example, personal sources, business sources, or information sources. Messages from each of these types of sources are transmitted by the paging terminal 105 (FIG. 1) to the radio receiver 110 on different addresses such that the CPU 220 can determine the source of a message by decoding the address associated with the message and referencing the ROM 250. Alternatively, each message could have source information appended thereto within the RF signal for conveying the source of the message to the CPU 220, or messages from different sources could be received on different predetermined frequencies or during different predetermined time slots during transmission of the RF signal.

Further included in the radio receiver 110 is a message database 252 into which information stored in the message buffer 245 is moved when space within the message database 252 is sufficient. As shown, the message database 252 preferably stores each message, the source of the message, which is preferably determined by referencing the ROM 250, and the time of reception of the message. Additionally, the message database 252 stores an indication (shown as an "r" for read and a "u" for unread) of whether or not the message has been read by the user and a flag (shown as a lower case "a") indicating whether the message is "anchored", as will be explained in greater detail below.

Preferably, a status database 255 is coupled to the CPU 220 for storing a listing of each of the sources from which the radio receiver 110 can receive messages and a status of each of the sources as being "anchored" or "unanchored". In accordance with a preferred embodiment of the present invention, an unanchored status of a source indicates that the message is to be stored, displayed, and deleted in a conventional manner. An anchored status of a source, however, can affect not only the deletion order of the message, but also the display of the message. More specifically, the last received message on each anchored source is designated by the CPU 220 as an anchored message for that source. In situations in which storage space within the message database 252 is insufficient for storage of an incoming message from the message buffer 245, the anchored messages from any anchored sources will not be deleted until after deletion of all unanchored messages stored by the radio receiver 110. Additionally, anchored messages which have not been read by the user will preferably not be deleted until after deletion of read, anchored messages.

The CPU 220, the message buffer 245, the message database 252, the status database 255, and the ROM 250 can be implemented using a microcomputer 270, such as the MC68HC05 microcomputer manufactured by Motorola, Inc. of Schaumburg, Ill. Alternatively, the listed elements can be implemented using hard-wired logic capable of performing the equivalent operations. Additionally, the message buffer 245, the message database 252, and the status database 255 can be implemented using a single memory device, such as a random access memory (RAM).

Figure 3:
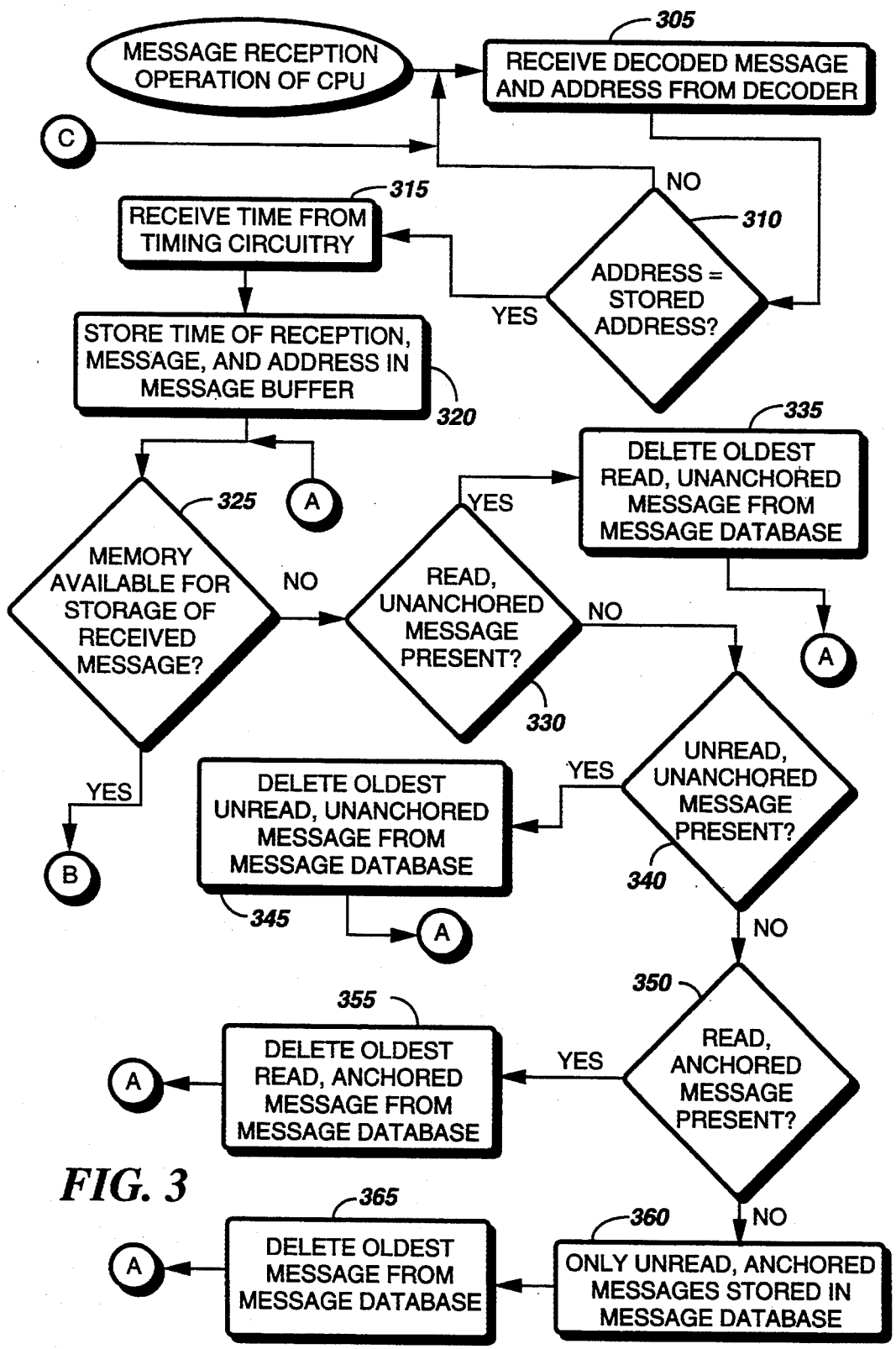
FIGS. 3 and 4 are flowcharts depicting the message reception operation of a central processing unit included in the radio receiver of FIG. 2 in accordance with a preferred embodiment of the present invention.
Figure 4:
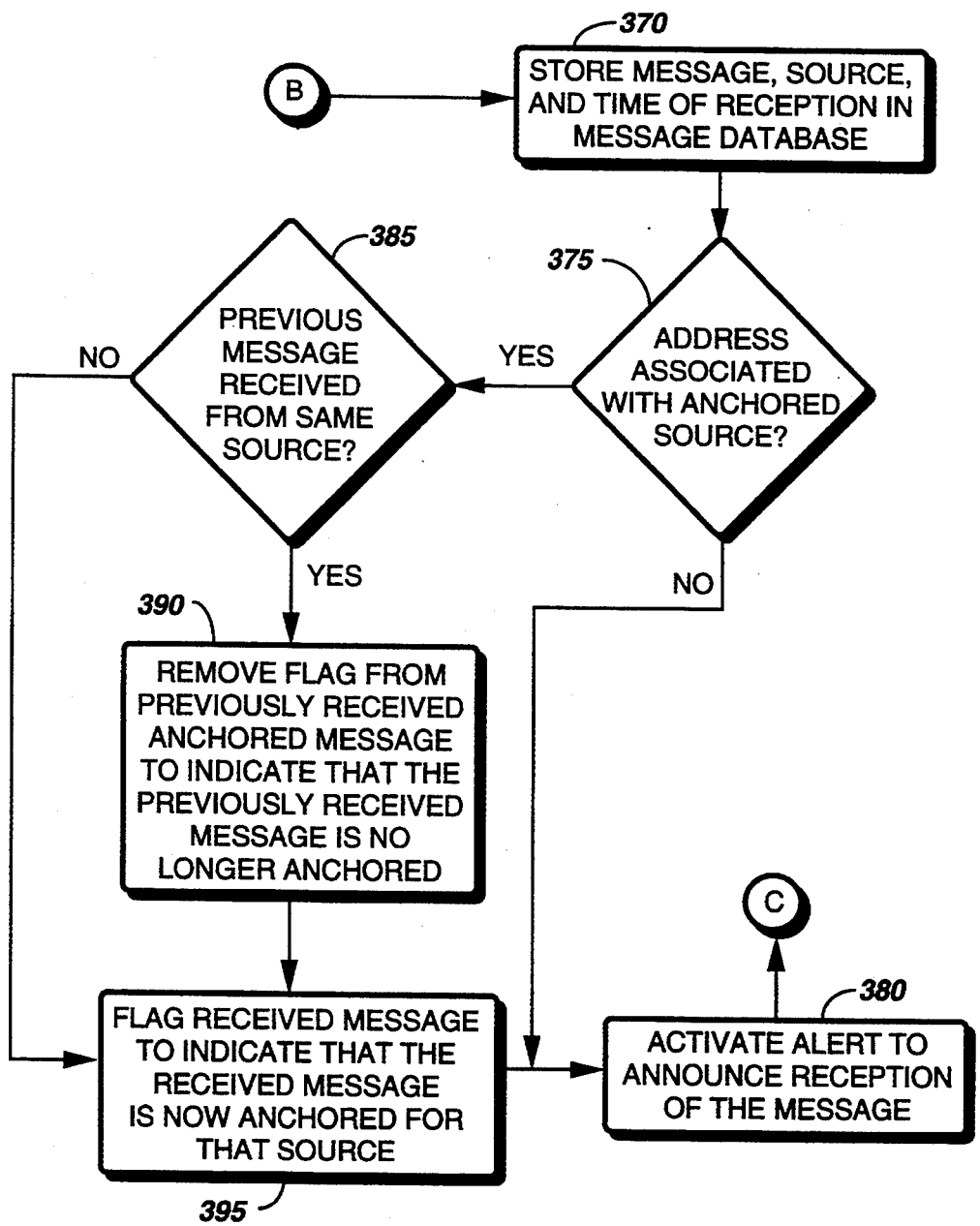

FIGS. 3 and 4 are flowcharts illustrating the message reception operation of the CPU 220 in accordance with the preferred embodiment of the present invention. Referring to FIG. 3, when, at step 305, the CPU 220 receives a decoded address and message from the decoder 215, the address is compared, at step 310, to the list of addresses stored in the ROM 250 to determine whether the address is one on which the radio receiver 110 is authorized to receive messages. When the received address is equivalent to a stored address, the CPU 220 receives, at step 315, a time value indicating time of message reception from the timing circuitry 225 (FIG. 2). The time, message, and address are then, at step 320, stored in the message buffer 245.

Next, at step 325, the CPU 220 determines, in a manner well known to one of ordinary skill in the art, whether the unused space in the message database 252 is sufficient for storage of the message information now residing in the message buffer 245. When the unused space is insufficient, the CPU 220 preferably proceeds, at step 330, to determine whether any read, unanchored messages are currently stored in the message database 252. When so, the oldest read, unanchored message is deleted, at step 335, from the message database 252, subsequent to which the CPU 220 again checks, at step 325, the amount of memory available in the message database 252. When the message database 252 is full and no read, unanchored messages are stored, the CPU 220 determines, at step 340, whether any unread, unanchored messages are stored in the message database 252. When so, the oldest unread, unanchored message is deleted, at step 345. When the message database 252 is full, and there are no unanchored messages stored, the CPU 220 determines, at step 350, whether any read, anchored messages are stored. In response to determining that at least one read, anchored message is stored in the message database 252, the CPU 220 deletes, at step 355, the oldest read, anchored message. Finally, when the message database 252 is full, and it is determined, at step 360, that only unread, anchored messages are stored in the message database 252, the CPU 220 preferably deletes, at step 365, the oldest unread, anchored message.

Referring to FIG. 4, when the CPU 220 determines that sufficient space exists within the message database 252, the incoming message, time of reception, and source associated with the message address are stored, at step 370, in the message database 252. In accordance with the preferred embodiment of the present invention, the CPU 220 then determines, at step 375, whether or not the message source is anchored. When the message source is not anchored, the CPU 220 activates, at step 380, the alert 230 (FIG. 2) for generation of a sensible alert announcing reception of the message.

When the message source is an anchored source, the CPU 220 determines, at step 385, whether any previous messages were received from the same source, i.e., whether an anchored message for the same source is stored in the message database 252. When so, a previously set "flag", or indication that the message is anchored, is removed, at step 390, from the previously received anchored message from the same source. When the flag for a previously received message from the same source has been removed, or when no message from the same source has been previously received, the current message from the source is flagged, at step 395. This flag indicates that the current message is now anchored. Thereafter, the alert 230 is activated, at step 380, to announce reception of the message.

In this manner, when the message database 252 has insufficient space for storage of an incoming message, messages are deleted from the message database 252 in an order determined first by the anchor status of the message sources, then by whether or not the messages have been read by the user, and then by the time of reception. Therefore, a user of the radio receiver 110 can be assured that an anchored message, i.e., the last received message from a designated source, is not deleted until all other types of messages have been deleted as necessary.

Referring next to FIG. 5, a table of example messages stored by the message database 252 is shown. In this example, the messages received by the radio receiver 110 are received from three sources: personal, business, and stock service. By referring to the times of reception, it can be seen that, for illustrative purposes only, the messages are arranged by the reception times, i.e., the message at the bottom of the table was first received, and the message at the top of the table was last received. The table further depicts the status of each message as read or unread ("r" or "u") and as anchored or unanchored ("a" when anchored). For this example, only the stock service source is anchored, and, accordingly, the last received message from the stock source is flagged with an "a". In actual implementation, it will be recognized that a simple method for designating message status would be to assign a first bit in each message memory slot for presentation status and to assign a second bit for anchoring status. The first bit could, for instance, be set to "one" to indicate that the message has been read and set to "zero" to indicate that the message has not been read. Similarly, the second bit could be normally set to "zero" to indicate that a message is unanchored and set to "one" to indicate that it is anchored.

In the table of example messages shown in FIG. 5, the last received message ("Filters, Inc. Stock at 70") from the stock service source is, in accordance with the preferred embodiment of the present invention, flagged to indicate that it is anchored. Therefore, this message, which is the only anchored message, will not be deleted from the message database 252 until after deletion of all the other messages, which, if necessary, will be deleted by time of reception and presentation status, as may be better understood by referring to FIG. 6.

FIG. 6 is a table depicting the deletion order of the messages shown in FIG. 5. As shown, the oldest read, unanchored message would, if necessary, be deleted first from the message database 252. Thereafter, when all read, unanchored messages have been deleted, the unread, unanchored messages would be deleted in an order determined by reception time. Finally, the read, anchored message from the stock service would be deleted if necessary. Although not shown in this example, an unread, anchored message from another anchored source would not be deleted until after deletion of the read, anchored message from the stock service.

In this way, the user can prevent deletion of messages most recently received from anchored sources. This is very convenient for situations in which the most recently received message is important to the user. Such a situation could arise, for instance, when the latest stock price or news update from a source is considered to be of greater importance than previously received stock prices or news items. The use of anchored sources can be useful for personal situations as well. For instance, a child could inform his mother of his latest location, which would be stored and anchored to prevent deletion of the latest location. Previous locations, which are no longer of importance, would therefore be deleted prior to deletion of the message relating the latest location.

The designation of anchored sources could be programmed, at the user's request, by a service center from which the radio receiver 110 is leased or purchased. Alternatively, the status of the sources could be user-programmable via the controls 235, as described in FIG. 7 and illustrated in FIG. 8.

Figure 7:
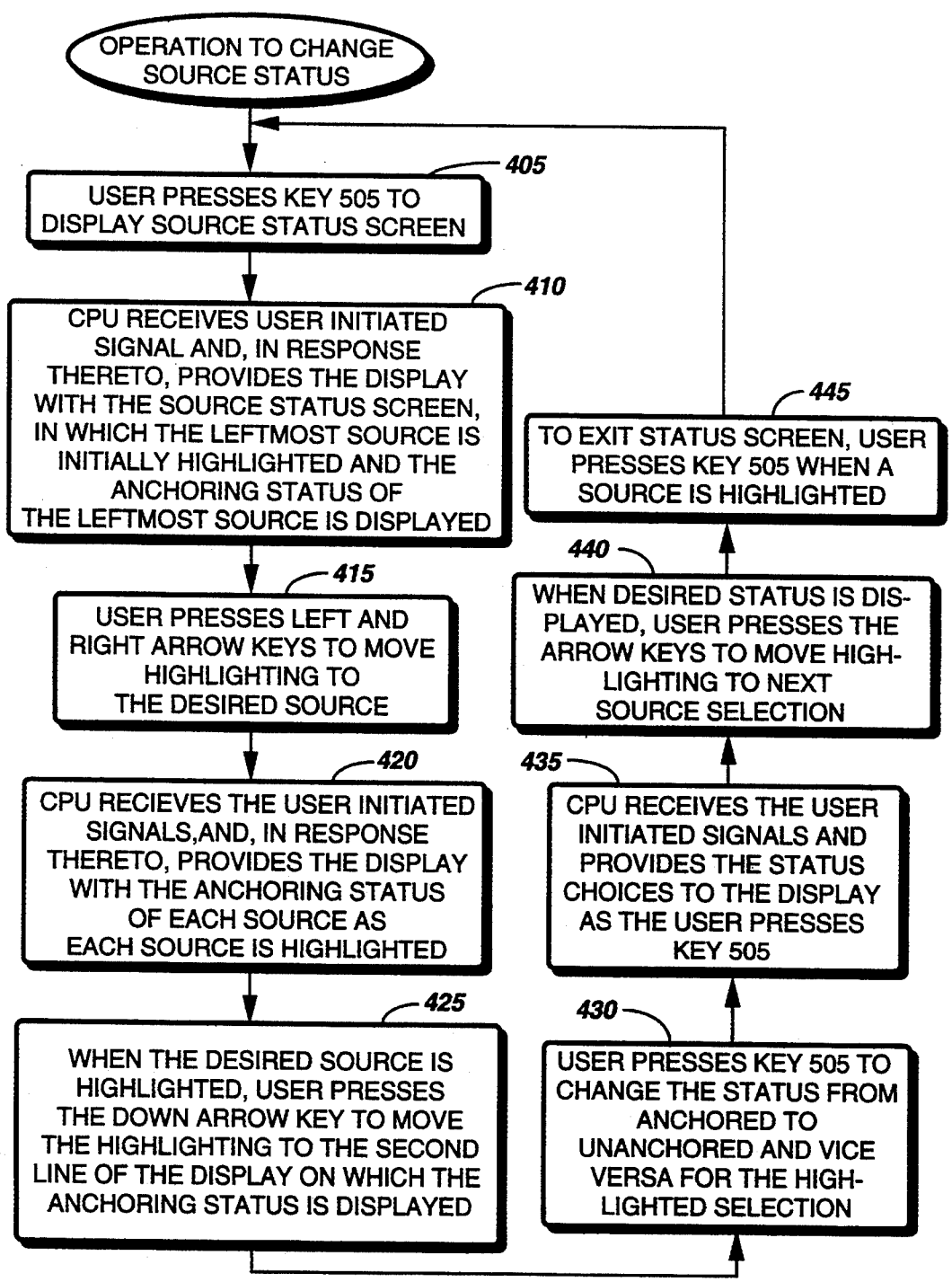
FIG. 7 is a flowchart depicting the programming of source statuses of sources from which messages are received by the radio receiver of FIG. 2 in accordance with a preferred embodiment of the present invention.
Figures 8, 10:
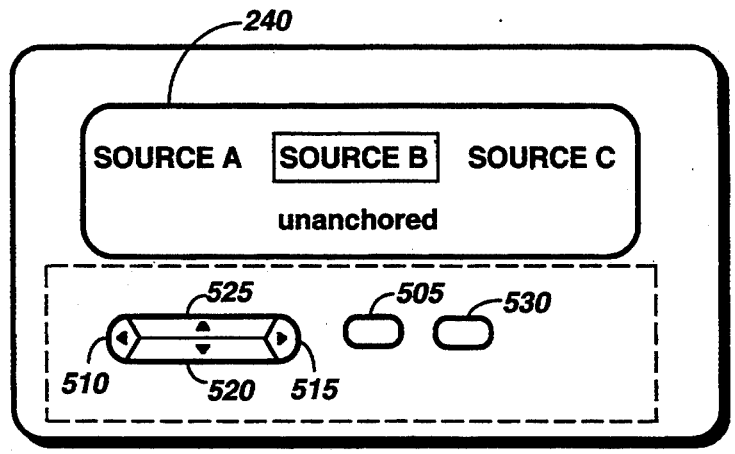
FIG. 8 is an illustration of a source status screen displayed by the radio receiver of FIG. 2 in accordance with a preferred embodiment of the present invention.
FIG. 10 is a table showing the order of message presentation for the example messages of FIG. 5 in accordance with the alternate embodiment of the present invention.

FIG. 7 is a flowchart depicting one way in which the user controls could be manipulated for programming of source status. FIG. 8 is an illustration of a radio receiver 110 having controls 235 accessible to the user and a display 240 for displaying information. Programming of the status of each source is initiated, at step 405 (FIG. 7), when the user presses control key 505 (FIG. 8) on the radio receiver 110. The pressing of key 505 sends a signal to the CPU 220 (FIG. 2), in response to which the CPU 220 provides, at step 410, the display 240 with a source status screen, as shown in FIG. 8. The source status screen can, for example, include a first line on which each receiver source is shown. Upon display of the screen, the leftmost of the active sources is preferably highlighted by a cursor, such as an underline or a box surrounding the source, and the anchoring status of the highlighted source is displayed on a second line of the display 240. Thereafter, the user presses, at step 415, the left and right arrow keys 510, 515 (FIG. 8) to move the cursor to the left or right and thus highlight a desired source. In response to receiving the signals from the left and right arrow keys 510, 515, the CPU 220 provides, at step 420 (FIG. 7) the display 240 with the anchoring status for the highlighted source. After highlighting the desired source, the user can press, at step 425, the down arrow key 520 (FIG. 8) to move the cursor to the second line of the display 240. Key 505 can then be pressed, at step 430, to change the status from "anchored" to "unanchored" and vice versa with each press of key 505. As the CPU 220 receives signals indicating each press of key 505, the status choices are provided, at step 435, to the display 240 for presentation thereby. When the desired anchoring status for the source is displayed, at step 440, the user can press the up arrow key 525 to return to the first line of the display 240, then press the left and right arrow keys 510, 515 to move the cursor to a next desired source. The anchoring status of the next highlighted source can be changed in a similar manner to that described above in reference to step 415 through step 435. To exit the status screen, the user can, at step 445, press key 505 when the cursor is located on the first line of the display 240. It will be appreciated by one of ordinary skill in the art that the above-described keystrokes are for illustrative purposes only and that any combination of keystrokes or any programming method could be utilized instead.

The user-programming of the anchoring status for each source conveniently allows a user to vary the sources which are anchored as the information provided by each source becomes more or less important. After selling a particular stock, for example, the latest price for that stock may be unimportant to the user, and the user may not care in what order the latest stock price is deleted. In such a case, the stock service source can be unanchored by the user to ensure that the message database 252 has plenty of available space for storage of recently received messages from other anchored sources.

Figure 9:
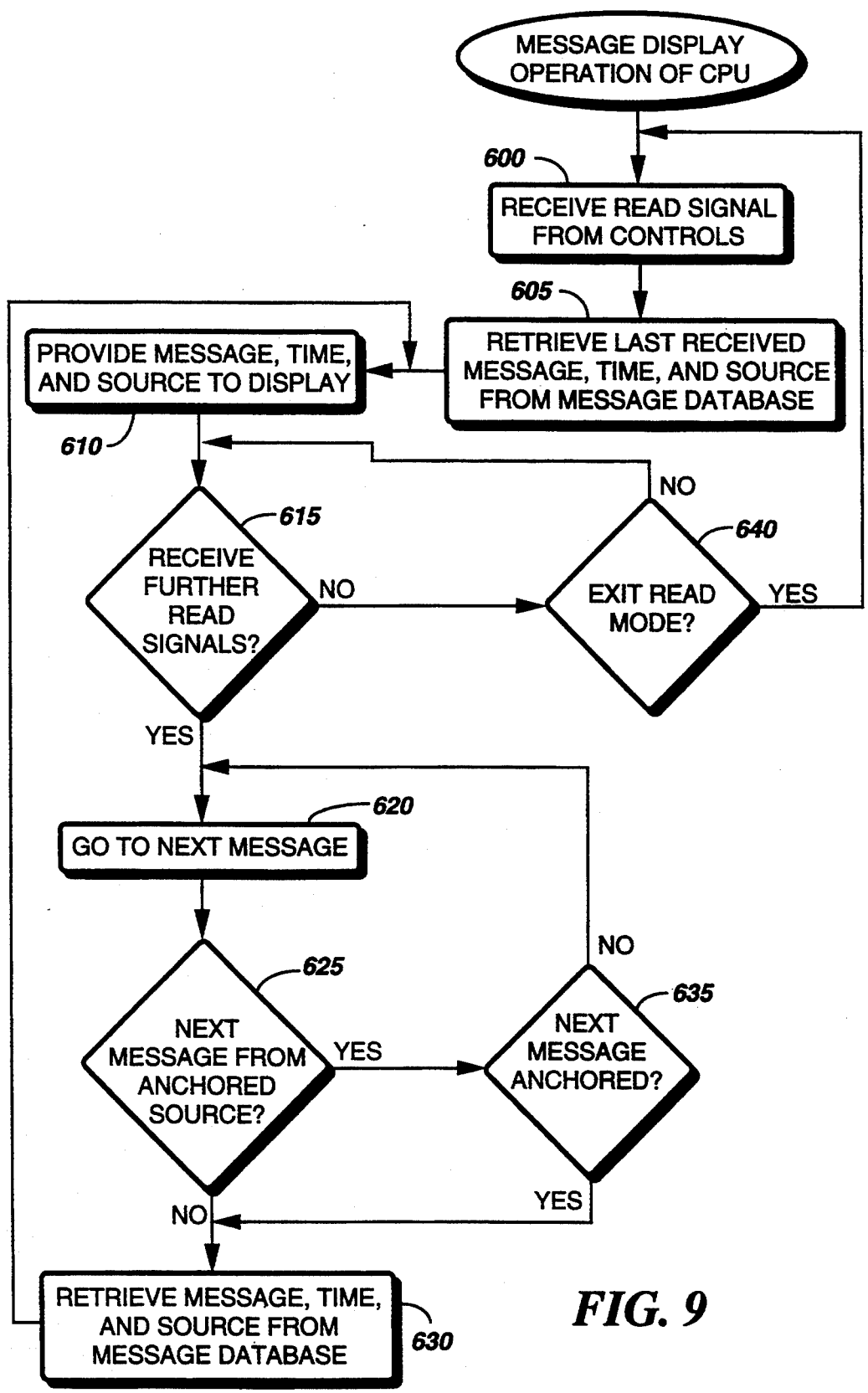
FIG. 9 is a flowchart depicting the operation of the central processing unit when displaying messages in accordance with an alternate embodiment of the present invention.

In another embodiment of the present invention, only anchored messages from an anchored source can be displayed by the user. This is illustrated in the flowchart of FIG. 9. When, at step 600, the CPU 220 receives a "read" signal from the controls 235, indicating that the user desires to read stored messages, the CPU 220 retrieves, at step 605, the last received message, the time of message reception, and the source associated with the message from the message database 252. This "read" signal can, for instance, originate with the pushing of control key 530 (FIG. 8) by the user. The retrieved information is subsequently provided, at step 610 (FIG. 9), to the display 240 for presentation thereby. When, at step 615, further "read" signals are received, the CPU 220, at step 620, goes to the next message and determines, at step 625, whether the next message is from an anchored source. When the next message is not from an anchored source, the next message, time of reception, and address are retrieved, at step 630, and provided, at step 610, to the display 240.

When the source of the next message is determined to be anchored, the CPU 220 further determines, at step 635, whether the message itself is anchored. When so, the message, time, and source are retrieved and displayed, at steps 630, 610. When the message is unanchored, the CPU 220 preferably goes to the next message, at step 620, without displaying the unanchored message from the anchored source. Therefore, the user is not confused with outdated information from anchored sources. Using the above example, a user awaiting a specific stock price before selling is usually concerned with the latest price only, and a display of outdated stock prices for the stock under consideration would more than likely be of no use or interest. The display of messages is ended when the user chooses, at step 640, to exit from the "read" mode of operation, perhaps by pressing control key 505 (FIG. 8) during the display of messages.

This display of messages may be better understood by next referring to FIG. 10, which is a table depicting the order of message presentation for the example messages first introduced in FIG. 5. As shown, the messages are preferably displayed in an order determined by reception time, i.e., most recently received messages first. However, because the stock service source is anchored, the latest message from the stock service is the only message from the stock service which is displayed. Messages from other, unanchored sources are all displayed, as shown.

Although, in the above-described embodiment, the anchored sources are described as each having a single anchored message, i.e., the last received message for each anchored source, it will be appreciated that the number of anchored messages provided for each source could be set at a number greater than one (1) or could be user-programmable. The radio receiver 110 could, for example, be pre-programmed in such a way that the user could manipulate the controls 235 (FIG. 2) to adjust not only the anchoring status of each source, but the number of anchored messages for each anchored source as well.

In accordance with an alternate embodiment of the present invention, the deletion order of the stored messages can be further defined by a "persistence" level of each source. Sources could be programmed to be low persistence, e.g., low priority, sources or high persistence, e.g., high priority, sources. The persistence level, either low or high, of each source could be programmed by a service center or, in a manner similar to that described above, by the user of a radio communication device. The deletion order of messages in accordance with the alternate embodiment of the present invention is listed below, with first-deleted messages at the top of the list and last-deleted messages at the bottom of the list:

1) Low persistence, read, unanchored messages;
2) High persistence, read, unanchored messages;
3) Low persistence, unread, unanchored messages;
4) High persistence, unread, unanchored messages;
5) Low persistence, read, anchored messages;
6) High persistence, read, anchored messages;
7) Low persistence, unread, anchored messages; and
8) High persistence, unread, anchored messages.

When available space in memory is low, the processing unit of the radio preferably deletes the oldest message in each of the eight categories first. In other words, deletion order is further affected by the reception time of each message within the eight categories according to the alternate embodiment. In accordance with this alternate embodiment of the present invention, the user can prioritize received messages by source. This can be very useful in situations where messages received from some sources are more important than others. For example, when information services messages are less important than personal messages, the user can designate the information services source as a low persistence source and the personal source as a high persistence source. Therefore, in general, the information services messages will be deleted before the personal messages are deleted. When the information services source is an anchored source, however, the last received of the information services messages will be anchored and deleted after the unanchored personal messages.

In summary, the radio receiver described above receives messages from a plurality of sources, each of which can be "anchored". When a source is anchored, the last received message from the anchored source is flagged in memory and placed at the bottom of the deletion list for the stored messages. Therefore, a user can conveniently program a desired source to be anchored, and then be assured that less important messages will always be deleted prior to deletion of anchored messages from that source.

Furthermore, in one embodiment of the radio receiver, while messages from unanchored sources are processed and displayed conventionally, only anchored messages from anchored sources can be displayed. As a result, for anchored sources, the user is only presented with the last received message, and previously received messages from that source are not displayed. This prevents the user from being confused by the presentation of outdated information which has been replaced by more up-to-date information.

It will be appreciated by now that there has been provided a method and apparatus for better prioritizing the deletion order of messages received by a radio communication device.

What is claimed is:

1. A method, in a radio receiver for receiving messages from a plurality of sources, for prioritizing a deletion order for received messages, the method comprising the steps of:
designating each of the plurality of sources as anchored sources or unanchored sources; and
flagging at least last received messages from the anchored sources as anchored messages, wherein the anchored messages are deleted only after deletion of stored messages which are not flagged as anchored messages, and wherein each of the at least last received messages is automatically flagged without user input in response to reception of each of the at least last received messages.

2. The method according to claim 1, wherein the designating step comprises the step of:
programming each of the plurality of sources as anchored or unanchored through use of user-accessible controls.

3. The method according to claim 1, further comprising, prior to the flagging step, the step:
programming a number of messages for each anchored source which is indicative of a number of anchored messages for each anchored source.

4. The method according to claim 1, further comprising the steps of:
designating stored messages, including the anchored messages, as read or unread, wherein read messages have been presented to a user and unread messages have not been presented to a user; and
prioritizing a deletion order of the stored messages depending upon whether each message is anchored and whether each message is read or unread.

5. The method according to claim 4, wherein the prioritizing step comprises the step of:
deleting, when read, unanchored messages are stored, the read, unanchored messages prior to deleting unread, unanchored messages in response to determining that space for storage of newer messages is insufficient.

6. The method according to claim 5, wherein the prioritizing step further comprises the step of:
deleting, when unread, unanchored messages are stored, the unread, unanchored messages prior to deleting read, anchored messages in response to determining that the space for storage of the newer messages is insufficient.

7. The method according to claim 6, wherein the prioritizing step further comprises the step of:
deleting, when read, anchored messages are stored, the read, anchored messages prior to deleting unread, anchored messages in response to determining that the space for storage of the newer messages is insufficient.

8. The method according to claim 4, wherein the prioritizing step comprises the steps of:
deleting read, unanchored messages prior to deleting unread, unanchored messages;
deleting unread, unanchored messages prior to deleting read, anchored messages; and
deleting read, anchored messages prior to deleting unread, anchored messages.

9. The method according to claim 4, further comprising the step of:
further prioritizing the deletion order of the messages depending upon a time of reception of each message.

10. The method according to claim 4, further comprising the steps of:
designating each of the plurality of sources as low persistence sources or high persistence sources; and
further prioritizing the deletion order of the stored messages depending upon whether a source from which each message was received is a high persistence source or a low persistence source.

11. The method according to claim 10, further comprising the steps of:
deleting low persistence, read, unanchored messages prior to deleting high persistence, read, unanchored messages;
deleting high persistence, read, unanchored messages prior to deleting low persistence, unread, unanchored messages;
deleting low persistence, unread, unanchored messages prior to deleting high persistence, unread, unanchored messages;
deleting high persistence, unread, unanchored messages prior to deleting low persistence, read, anchored messages;
deleting low persistence, read, anchored messages prior to deleting high persistence, read, anchored messages;
deleting high persistence, read, anchored messages prior to deleting low persistence, unread, anchored messages; and
deleting low persistence, unread, anchored messages prior to deleting high persistence, unread, anchored messages.

12. A radio receiver for receiving messages from a plurality of sources, the radio receiver comprising:
first designating means for designating each of the plurality of sources as anchored sources or unanchored sources; and
flagging means coupled to the first designating means for flagging at least last received messages from the anchored sources as anchored messages, wherein the anchored messages are deleted only after deletion of stored message which are not flagged as anchored messages, and wherein each of the at least last received messages is automatically flagged without user input in response to reception of each of the at least last received messages.

13. The radio receiver according to claim 12, further comprising:

a memory coupled to the first designating means and the flagging means for storing the messages.

14. The radio receiver according to claim 12, further comprising:
programming means coupled to the first designating means for programming each of the plurality of sources as anchored or unanchored.

15. The radio receiver according to claim 12, further comprising:
programming means coupled to the flagging means for programming a number of messages for each anchored source which is indicative of a number of anchored messages for each anchored source.

16. The radio receiver according to claim 13, further comprising:
second designating means coupled to the memory for designating stored messages, including the anchored messages, as read or unread, wherein read messages have been presented to a user and unread messages have not been presented to a user; and
prioritizing means coupled to the memory for prioritizing a deletion order of the stored messages depending upon whether each message is anchored and whether each message is read or unread.

17. The radio receiver according to claim 16, further comprising:
determining means coupled to the memory for determining whether space within the memory is sufficient for storage of newer messages; and
deleting means for deleting unanchored messages prior to deleting the anchored messages when the space within the memory is insufficient for storage of the newer messages.

18. The radio receiver according to claim 16, further comprising:
first deleting means coupled to the memory for deleting read, unanchored messages prior to deleting unread, unanchored messages;
second deleting means coupled to the memory for deleting unread, unanchored messages prior to deleting read, anchored messages; and
third deleting means coupled to the memory for deleting read, anchored messages prior to deleting unread, anchored messages.

19. The radio receiver according to claim 16, further comprising:
third designating means coupled to the memory for designating each of the plurality of sources as low persistence sources or high persistence sources, wherein the prioritizing means further prioritizes the deletion order of the stored messages depending upon whether a source from which each message was received is a high persistence source or a low persistence source.

20. The radio receiver according to claim 19, further comprising:
first deleting means for deleting low persistence, read, unanchored messages prior to deleting high persistence, read, unanchored messages;
second deleting means for deleting high persistence, read, unanchored messages prior to deleting low persistence, unread, unanchored messages;
third deleting means for deleting low persistence, unread, unanchored messages prior to deleting high persistence, unread, unanchored messages;
fourth deleting means for deleting high persistence, unread, unanchored messages prior to deleting low persistence, read, anchored messages;
fifth deleting means for deleting low persistence, read, anchored messages prior to deleting high persistence, read, anchored messages;
sixth deleting means for deleting high persistence, read, anchored messages prior to deleting low persistence, unread, anchored messages; and
seventh deleting means for deleting low persistence, unread, anchored messages prior to deleting high persistence, unread, anchored messages.

21. A radio receiver for receiving messages from a plurality of sources, the radio receiver comprising:
a message database for storing the messages and sources from which the messages originate;
a processing unit for determining whether each source has a status of anchored or unanchored and for automatically flagging, without user input, last received messages from anchored sources to indicate that the last received messages are anchored messages which are to be deleted only after deletion of unanchored messages which are not flagged as anchored messages.

22. The radio receiver according to claim 21, further comprising:
a display for displaying unanchored messages received from unanchored sources and for displaying the anchored messages received from the unanchored sources.

23. The radio receiver according to claim 21, further comprising:
a receiver for receiving and demodulating a radio signal to generate data therefrom; and
a decoder coupled to the receiver for decoding the data to recover the messages and addresses associated with the messages, wherein each different address is associated with one of the plurality of sources.

24. The radio receiver according to claim 23, further comprising:
a memory coupled to the processing unit for storing a list of the plurality of sources and an address associated with each of the plurality of sources; and
a status database coupled to the processing unit for storing a list of the plurality of sources and a status associated with each of the plurality of sources, wherein the status is anchored or unanchored.

25. The radio receiver according to claim 25, further comprising controls coupled to the processing unit for receiving user inputs for programming the status of each of the plurality of sources in the status database.

* * * * *